United States Patent
Duisenberg et al.

(10) Patent No.: US 7,823,004 B2
(45) Date of Patent: Oct. 26, 2010

(54) CLOCK SOURCE SELECTION FOR MODULAR COMPUTER SYSTEM AS A FUNCTION OF MODULO DIFFERENCE

(75) Inventors: Kenneth C Duisenberg, Roseville, CA (US); Joshua Kennon Crechriou, Roseville, CA (US); Michael J. Allen, Rescue, CA (US); Kenneth N Konesky, North Highlands, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 688 days.

(21) Appl. No.: 11/832,237

(22) Filed: Aug. 1, 2007

(65) Prior Publication Data

US 2009/0037761 A1 Feb. 5, 2009

(51) Int. Cl.
*G06F 1/04* (2006.01)
(52) U.S. Cl. ........................ 713/600; 713/400
(58) Field of Classification Search ............... 713/600, 713/400
See application file for complete search history.

(56) References Cited

U.S. PATENT DOCUMENTS

| | | | |
|---|---|---|---|
| 6,442,640 B1 * | 8/2002 | Eby et al. | 710/305 |
| 6,754,171 B1 * | 6/2004 | Bernier et al. | 370/216 |
| 7,272,665 B2 * | 9/2007 | Yamada et al. | 710/3 |
| 7,562,247 B2 * | 7/2009 | Baker et al. | 714/2 |
| 2005/0218953 A1 | 10/2005 | Slawecki | |
| 2005/0259642 A1 * | 11/2005 | Yang et al. | 370/376 |
| 2006/0053395 A1 | 3/2006 | Lai et al. | |
| 2006/0209170 A1 | 9/2006 | Nihei | |
| 2006/0212636 A1 * | 9/2006 | Yasuo | 710/303 |
| 2006/0215629 A1 | 9/2006 | Miller et al. | |
| 2008/0046774 A1 * | 2/2008 | Hirai et al. | 713/500 |
| 2008/0126630 A1 * | 5/2008 | Farkas et al. | 710/69 |

* cited by examiner

*Primary Examiner*—Chun Cao

(57) ABSTRACT

A computer system provides for connecting consecutively positioned modules to operate collectively as server. Each module calculates a modulo difference between its position and that of a module serving as a clock source; each module selects a clock input as a function of the result of that calculation.

14 Claims, 5 Drawing Sheets

CLOCK SOURCE SELECTION FOR MODULAR COMPUTER SYSTEM AS A FUNCTION OF MODULO DIFFERENCE

BACKGROUND OF THE INVENTION

Modular computer systems provide for computing power, expansion, and replacement within a confined space. For example, a rack mount system can allow many rack-format computers to be installed in a single rack. Blade servers extend this idea further by transferring some of the functionality of a computer to the rack itself. For example, power supplies can be located in the rack instead of the servers themselves. This allows the blade servers to be smaller so that more computing power can be provided per unit space. Also, the blade servers themselves can be more economical due to fewer components.

As each module can run a different workload, it can be desirable to allow computing modules to have different specifications, e.g., number of processors or the amount of memory. On the other hand, providing modules with different specifications can result in some loss of the economies of scale, which loss can lead to higher prices. What is needed is an approach that provides different levels of computational power to different workloads while retaining economies of scale.

Herein, related art is described to facilitate understanding of the invention. Related art labeled "prior art" is admitted prior art; related art not labeled "prior art" is not admitted prior art.

BRIEF DESCRIPTION OF THE DRAWINGS

The figures depict implementations/embodiments of the invention and not the invention itself.

DETAILED DESCRIPTION

In the course of the present invention, it was determined that an effective way to provide for flexible allocations of computer power to workloads while retaining economies of scale in manufacturing modules is to allow modules to be connected or "gained" to operate as a single server. One of the requirements for operating as a single server would be to be driven by a common clock, e.g., the clock of one of the modules in the group. To retain economies of scale, all modules should be nominally identical but be configurable to operate as a clock source or a clock slave. For convenience and cost reasons, any effort involved in configuring individual modules should be minimized.

The idea herein is to use a connector to connect a group of modules so that any one can serve as the clock source. Each module has a number of clock input ports. The connector connects each module of a group to a different one of these input ports. Each module is provided the identity of the module to serve as the clock source and configures itself to accept a clock signal to the clock input port coupled to the clock source module.

Different connectors are provided so that groups with different numbers of modules can be formed. However, different-sized groups can be formed by using only a subset of the available connector positions. In such case, a module that serves as a clock source can activate clock outputs that are coupled to clock inputs of other blades, while leaving other clock outputs inactive to minimize radio frequency emissions.

Figure 1:
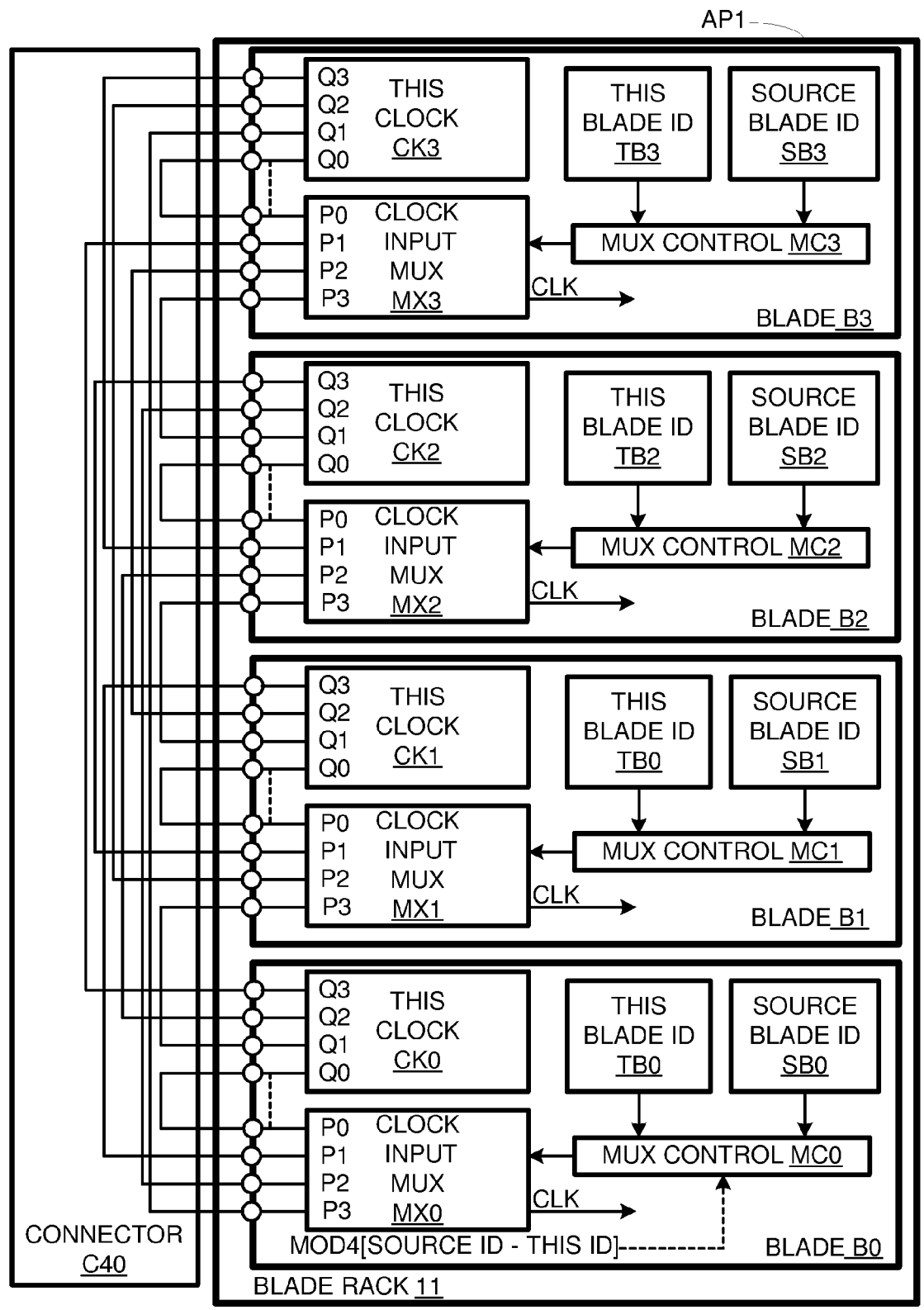
FIG. 1 is a schematic diagram of a blade server system with a four-way connector attached in accordance with an embodiment of the invention.
Figure 2:
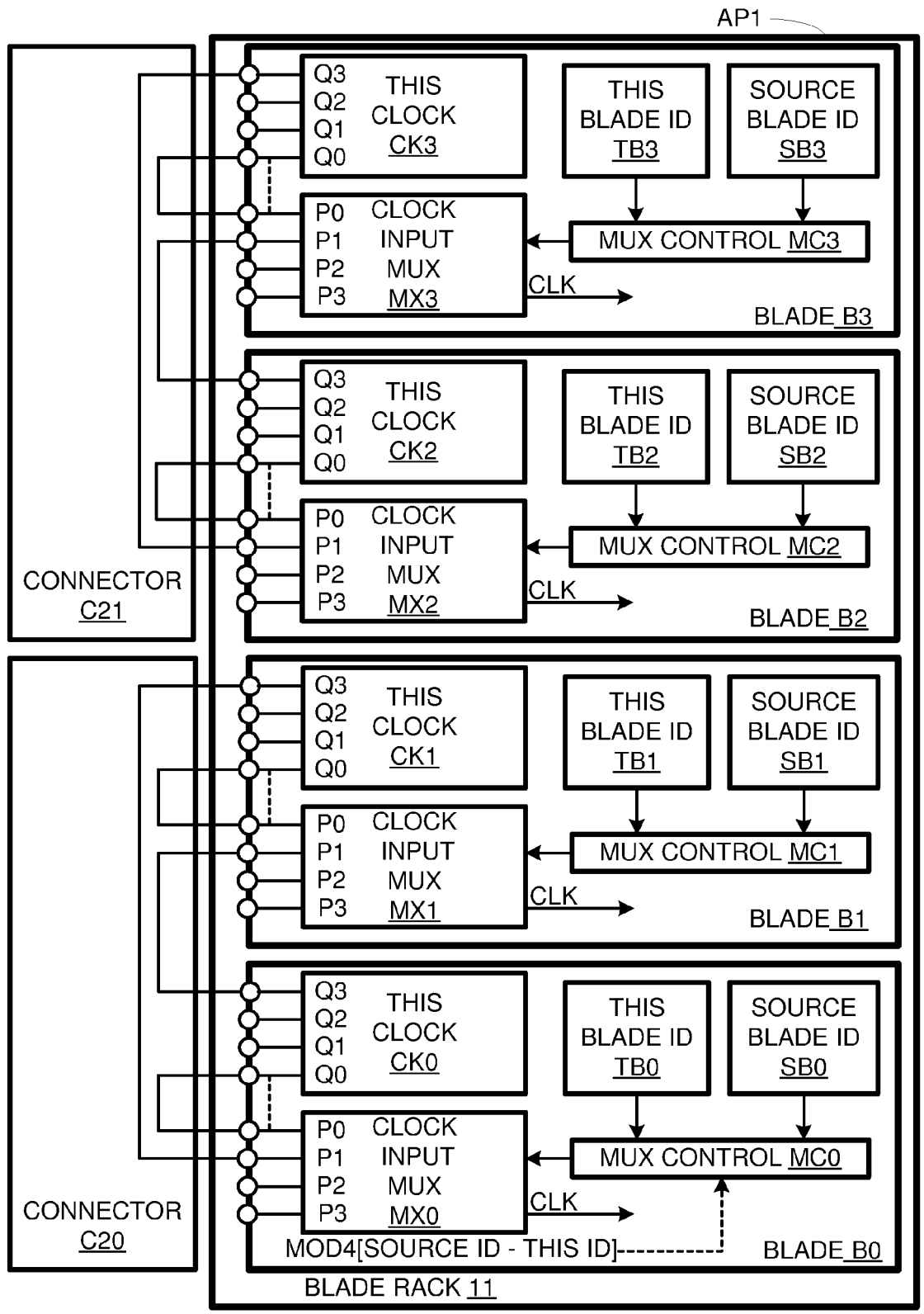
FIG. 2 is a schematic diagram of the blade server system of FIG. 1 with a pair of two-way connectors attached.
Figure 3:
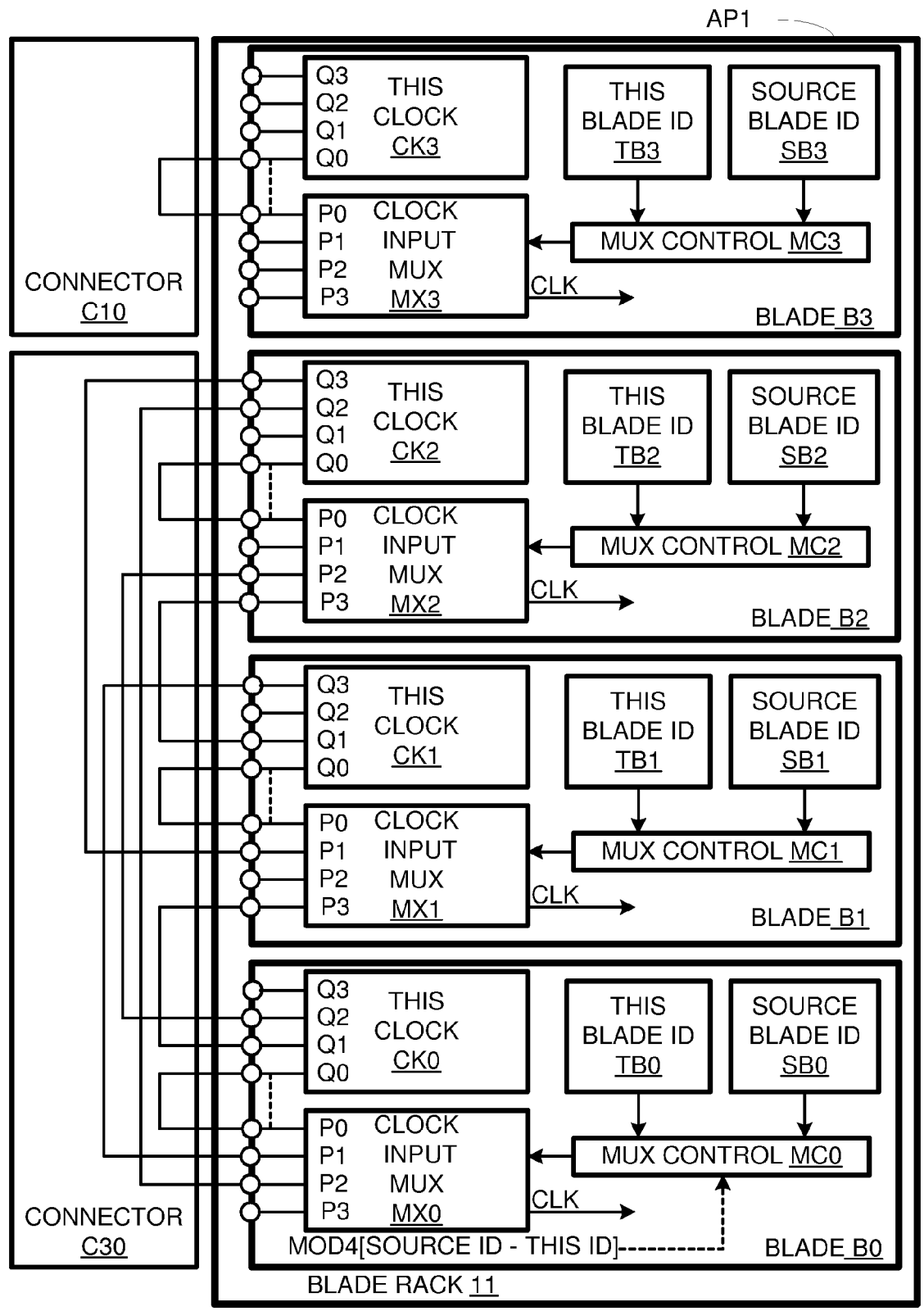
FIG. 3 is a schematic diagram of the blade server system of FIG. 1 with a three-way connector and a (one-way) self-connector attached.

A blade system API in accordance with an embodiment of the invention is shown in FIGS. 1-3 with different clock-distribution connectors attached. As illustrated, blade system API includes a four-blade rack 11. In practice, a blade rack would have many more blade positions, e.g., on the order of a hundred blade positions. The invention provides for a wide range of blade-rack capacities.

Four blades B0-B3 are shown installed in rack 11. For blade B0, "0" is the identity value of the rack position in which it is installed; as a result it has assumed a self-identity (or "this blade" identity) value of "0". Likewise, blades B1, B2, and B3 have assumed self-identity values of "1", "2", and "3" respectively.

Blade B0 has four clock inputs P0-P3, and four clock outputs Q0-Q3, a clock CK0, a clock input multiplexer ("mux") MX0, and a mux controller MC0. In addition, blade B0 stores the self-identity value of "0" at TB0 and a clock-source identity value at SB0, when such a value is provided to blade B0. When this value is provided, mux controller MC0 computes the modulo-4 difference between the clock-source identity value and the self-identity value and selects the corresponding clock input of mux MX0. Blades B1, B2, and B3, use the same formula to select a port for receiving a clock signal. The following Table I shows the formula results.

TABLE I

CALCULATION OF CLOCK INPUT SELECTION

| This ID | Clock Source ID | Source ID − This (Self) ID | Mod4 Difference |
|---|---|---|---|
| 0 | 0 | 0 | 0 |
|   | 1 | 1 | 1 |
|   | 2 | 2 | 2 |
|   | 3 | 3 | 3 |
| 1 | 0 | −1 | 3 |
|   | 1 | 0 | 0 |
|   | 2 | 1 | 1 |
|   | 3 | 2 | 2 |
| 2 | 0 | −2 | 2 |
|   | 1 | −1 | 3 |
|   | 2 | 0 | 0 |
|   | 3 | 1 | 1 |
| 3 | 0 | −3 | 1 |
|   | 1 | −2 | 2 |
|   | 2 | −1 | 3 |
|   | 3 | 0 | 0 |

Table I shows how, for each blade, selection of a source ID affects the clock selection input. Note, to avoid negative numbers, "4" can be added to the non-modular differences; the Mod4 difference is unaffected by this change. As can be discerned from Table I, clock input ports of a blade are connected on a round-robin basis to potential clock source blades. Thus, for blade B0, which has "this" ID 0, its input P0 is connected to its output Q0, its input P1 is connected to output Q3 of blade B1, its input P2 is connected to output Q2 of blade B2, and its input P3 is connected to output Q1 of blade B3. Note that the sum of the input port number and the output port number is always zero (Mod4). Thus, the input port number and the blade number collectively determine the blade and respective output port to which a connection is made.

For blade B1, its input P0 is connected to its own output Q0. Its input P1 is coupled to output Q3 of blade B2. Its input P2 is connected to output Q2 of blade B3. Its input P3 is coupled to output Q1 of blade B0, which is next in a round-robin series after blade B3. For blades B2 and B3, the round-robin character of the clock connects also causes wrap-arounds from blade B3 to blade B0.

Table II presents the same information in a different order to show how a selection of a source clock ID affects the distribution of clock signals to the respective blades.

TABLE II

DISTRIBUTION OF CLOCK SIGNALS

| This ID | Clock Source ID | Source ID – This (Self) ID | Mod4 Difference |
|---------|-----------------|---------------------------|-----------------|
| 0       | 0               | 0                         | 0               |
| 1       |                 | −1                        | 3               |
| 2       |                 | −2                        | 2               |
| 3       |                 | −3                        | 1               |
| 0       | 1               | 1                         | 1               |
| 1       |                 | 0                         | 0               |
| 2       |                 | −1                        | 3               |
| 3       |                 | −2                        | 2               |
| 0       | 2               | 2                         | 2               |
| 1       |                 | 1                         | 1               |
| 2       |                 | 0                         | 0               |
| 3       |                 | −1                        | 3               |
| 0       | 3               | 3                         | 3               |
| 1       |                 | 2                         | 2               |
| 2       |                 | 1                         | 1               |
| 3       |                 | 0                         | 0               |

From Table II it is clear that if all blades have the same clock source ID stored, each blade will select a different clock input port. However, if the connections provided by connector C40 are traced, it can be seen that all selected input ports connect to the clock-source blade specified in the second column of Table II.

Note that, for the blade selected as the clock source, clock input port P0 is always selected, and that this input port is always coupled to an output from the same clock-source blade. In an alternative embodiment, this connection is made internal to the blade without going through an external connector. Also, note that if the positions of the blades were shuffled, the blade identities would remain with the rack positions, so it is the blade positions rather than the blades themselves that determine the connections.

As noted above, the invention is not limited to four-blade racks. For example, connector C40 could be used to define a four-blade server constituted by any four consecutively positioned blades in a 100-blade or other size rack. Furthermore, multiple connectors such as four-way connector C40 can be used to define many four-blade servers in a single 100-blade rack. The formula used by the mux controllers to select an input works as well with, for example, blades at positions 76-79 as it does for blades at positions 0-3. The formula also can be applied to any arithmetic sequence (n, n+k, n+2 k, n+3 k) by simply subtracting n and dividing by k.

The invention provides for different numbers of blades to be included in a server. For example, FIG. 2 shows blade system API with a pair of two-way connectors C20 and C21 defining a pair of two-blade servers. Thus, connector C20 defines a two-blade server constituted by blades B0 and B1, while connector C21 defines a two-blade server constituted by blades B2 and B3. For each pair, either constituent blade can be selected as the clock source. In this case, the Mod4 difference still selects the correct clock inputs for all four blades B0-B3. Note that connector C40 can be used to define four one-way connections, two two-way connections, etc.

The invention provides for servers having any number of constituent blades or modules up to the number of clock input ports per module. For example, FIG. 3 shows blade system API with a three-way connector C30 defining a server for blades B0-B2. In addition, a one-way connector C10 ties a single clock input of blade B3 to its output so that its own clock drives it.

Note that connectors C40, C20, C21, and C30 are not symmetric as they employ round-robin connections. Connectors that are mirror images of those illustrated could be used, but the formula for selecting a clock input would have to be inverted so that it is of the form Mod [self ID-clock-source ID]. The modulus number equals the number of clock input ports per module.

Figure 4:
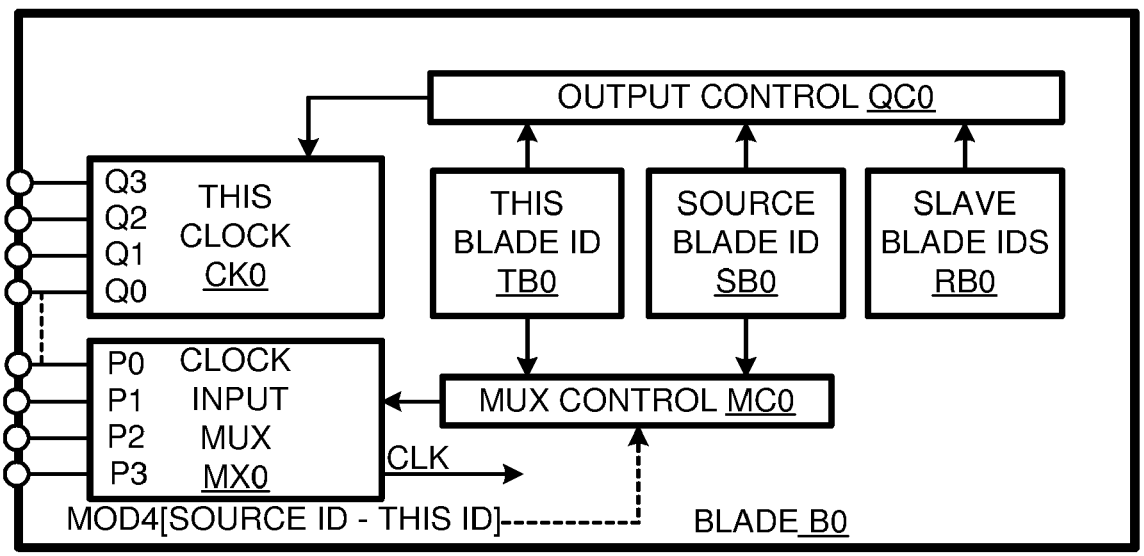
FIG. 4 is a more detailed schematic of one of the blades shown in FIGS. 1-3.

Blades B0-B3 further provide for specification of slave blade identity values, e.g., at RB0 for blade B0, as depicted in FIG. 4. This allows the functionality achieved with two or more smaller connectors to be achieved using a single connector. In other words, since clock slave identity values can be identified, more than one clock source can be selected from a group of modules, provided the corresponding sets of slave modules do not overlap. Thus, a single four-way connector can be used to provide the combined functionality of the two two-way connectors C20 and C21 in FIG. 2 or the combined functionality of connectors C30 and C10 in FIG. 3. For example, in FIG. 1, blade B0 can be selected as one clock source for itself and blade B1, while blade B2 can be selected as a second clock source with blade B3 as a slave. A single four-way connector such as C40 can thus be used to provide for two two-blade servers.

In addition, the slave identity values can be used to determine which clock outputs to activate. Clock signals transmitted to unselected inputs can cause radio frequency interference, so it can be important to activate only those outputs coupled to inputs selected as clock sources. If "this blade" identity value does not equal "source blade" identity value, the blade in question is not a clock source and all clock outputs should be inactive. If "this blade" identity value and the "clock-source" identity value are equal, then the blade in question is a clock source. The respective MOD4 difference between "this" blade value and the respective slave identity values indicate which outputs are activated. Accordingly, output control QC0 controls the outputs of clock CK0 according to the same basic formula used to select inputs.

Figure 5:
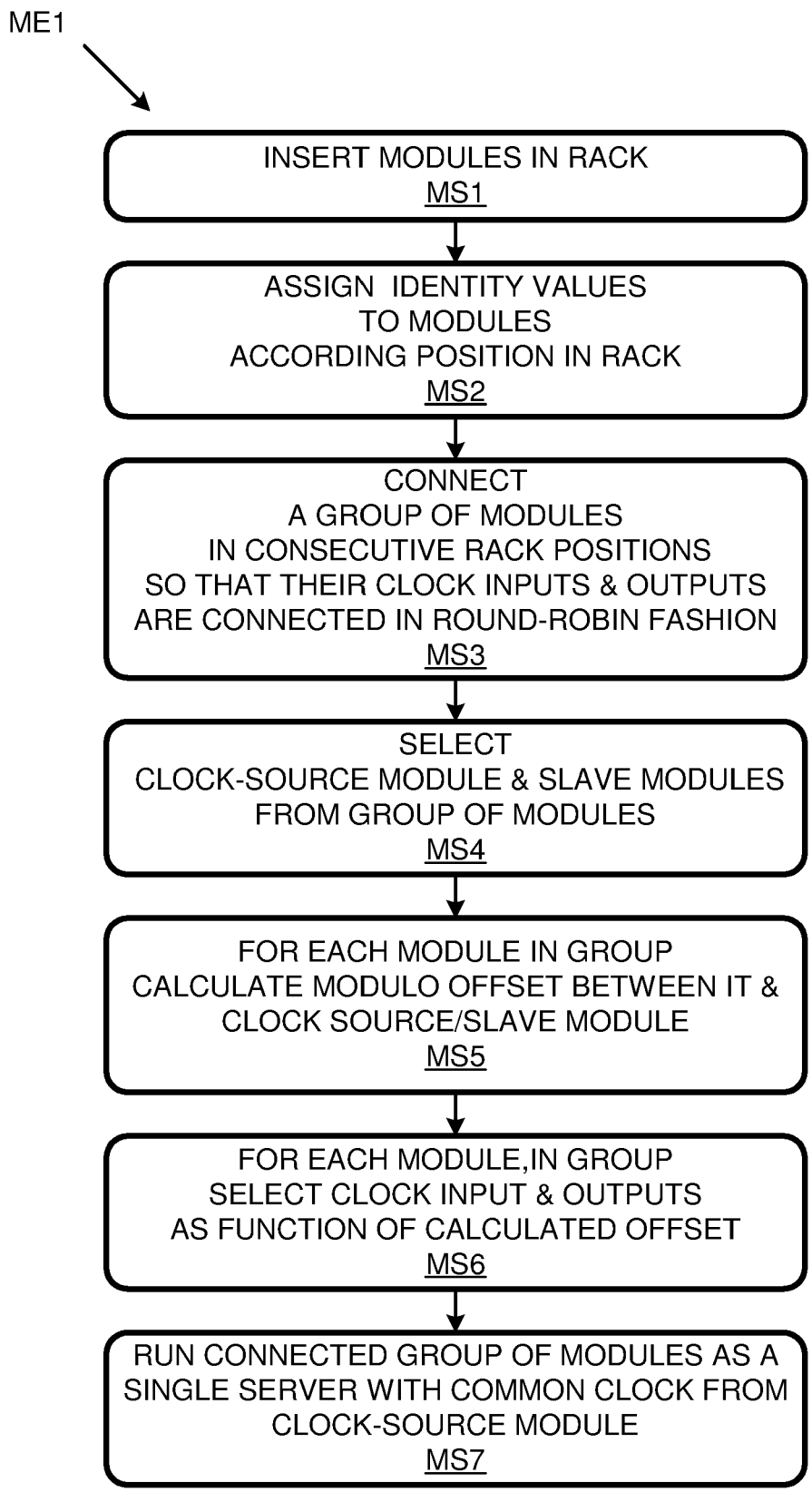
FIG. 5 is a flow chart of a method implemented in the system of FIG. 1 in accordance with a method embodiment of the invention.

A method of the invention is flow-charted in FIG. 5. At method segment MS1, modules are connected, e.g., by inserting them into a common rack. At method segment MS2, identity values are assigned to the modules as a function of their positions, e.g., in the rack.

At method segment MS3, a group of modules at consecutive rack positions are connected. In addition to providing data paths between the connected modules, the connection connects clock inputs and outputs in a round-robin fashion. For example, in the embodiment of FIGS. 1-3, the P1 inputs are always connected to an output of the next module in the group (with wrap around for the last module in a group). Likewise, the P2 inputs are coupled to outputs of modules two positions ahead in the group (with wrap around), etc. Note that the number of clock inputs on each module should be at least as great as the number of modules in the group.

At method segment MS4, one or more of the group of connected modules is selected as the clock source; this involves informing each module of the group as to the selection. Also, the slave modules are selected at method segment MS4.

At method segment MS5, each module calculates the modulo offset between the clock source module and itself; the modulus is typically the number of clock inputs on the modules (which should all have the same number of clock inputs). If "this module" is the clock source module, the modulo offsets between this clock source module and its slave modules are also calculated.

At method MS6, each module will select one of its clock inputs as a function of this calculation. In the illustrated embodiment, and in general, the modules will select non-corresponding inputs as each module has a different offset from the clock source module. Also, the foregoing calculations are used to determine which clock outputs of one or more clock source modules are to be activated.

At method segment MS6, a group of blades consisting of a clock-source module and its slave is run as a single server driven by the clock from the selected clock-source module. There can be one or more such servers defined by a single connector.

An N-way connector in accordance with the invention can be used to connect N computer modules so that each said module assumes one of N connector positions. These positions can be enumerated using N consecutive integer connector position values (e.g., 0 to N−1 or 1−N) so that each module has a different position value. Thus, each ordered pair of modules defines a relative position value equal to a modulo N difference between the respective connector position values for the pair.

Depending on whether the modules provide for an internal self-clocking connection, the modules can have N or N−1 clock input ports, each with a respective consecutive integer identity value. Each module can have a clock output means, e.g., N−1 or N clock output ports so that it can be selected as a clock source. The N-way connector provides at least N*(N−1) connections so that, for each of N modules, N−1 of its clock input ports are coupled to clock output means for N−1 different modules.

The modules must be able to determine which clock input ports to select as a clock source from information regarding the position of module serving as the clock source and the module to which the input belongs. To simplify this determination, connections are made so that the modulo N difference between the relative position value for the pair of modules including the module to which the clock output means that it connects belongs and the module the clock input port belongs and the clock input value of the clock input port that it connects does not vary according to the modulo N position value of the module to which the connection's clock input port belongs.

In addition, the modules should be able to determine which clock output ports to activate. To simplify this determination, for each of the modules, each of the connections connects one clock output port of one module to one clock input port of the same or another module so that the modulo N sum or difference of the respective clock input port value and the respective clock output port value does not vary across said connections.

The invention provides for a range of connectors. In addition to an N-way connector, which makes use of all available clock input ports, the invention provides for "smaller" M-way connectors, where 2≦M<N. In addition, where an external connection is required for a module to act as its own clock source, a 1-way connector is provided for.

A smaller M-way connector for connecting M of N computer modules, said M-way connector provides at least M*(M−1) connections. If external self-connections are required it is M*M connections). Each of the M*(M−1) connections connects one of the N−1 (or N) clock input ports of one module with a clock output means of another module. The connections are such that D does not vary as a function of which connector of said M-way and N-way connectors is connecting the modules, where D equals the modulo N difference between 1) the relative position value for the pair of modules including the module to which the clock output means that it connects belongs and the module the clock input port belongs, and 2) the clock input value of the clock input port that it connects. While different connectors may be used in the alternative, they can be used concurrently on different and mutually exclusive sets of modules.

The invention applies to blades, racks, and other modular systems in which modules are arranged in sequential positions. The invention allows for different numbers of module positions, different numbers of clock inputs per module, and different selections of connectors. The modules themselves can be fully functional computers, or the rack can provide some necessary components. These and other variations upon and modification to the illustrated embodiments are provided for by the present invention, the scope of which is defined by the following claims.

The invention claimed is:

1. A computer system comprising:
a computer module having a processor, memory, plural clock inputs, means for assuming a self-identity value provided by a rack into which it has been inserted, means for receiving a clock-source identity value, means for calculating a modulo difference between said clock-source identity value and said self-identity value, and means for selecting one of said clock inputs as a clock source as a function of said modulo difference.

2. A computer system as recited in claim 1 further comprising said rack and additional computer modules, each having a processor, memory, plural clock inputs, means for assuming a self-identity value provided by a rack into which it has been inserted, means for receiving a clock-source identity value, means for calculating a modulo difference between said clock-source identity value and said self-identity value, and means for selecting one of said clock inputs as a clock source as a function of said modulo difference.

3. A computer system as recited in claim 2 wherein, for each of said computer modules, its clock inputs are assigned consecutive whole number input-identity values according to their respective positions on the respective incorporating module, each of said modules being assigned is self-identity value as a function of its position in said rack.

4. A computer system as recited in claim 3 wherein each of said modules has exactly N clock inputs and said modulo difference is a modulo N difference.

5. A computer system as recited in claim 4 further comprising a two-way connector for connecting first and second of said modules so that a first clock input of said first module is connected to the clock output of said first module, so that a first clock input of said second module is communicatively coupled to the clock output of said second module, so that a second clock input of said first module is communicatively coupled to said clock output for said second module, and so that an Nth clock input of said second module is communicatively coupled to the clock output of said first module.

6. A computer system as recited in claim 5 further comprising a second two-way connector for connecting third and fourth of said modules.

7. A computer system as recited in claim 4 further comprising a N-way connector communicatively coupling at least first, second, and third ones of said modules so that all three can be governed by a clock output from any of said first, second, or third of said modules.

8. A method comprising:
   inserting a computer module into a rack so that said computer module assumes a self-identity value;
   inputting to said computer module, a source identity value for a clock-source computer module to serve as a clock source;
   selecting one of plural clock inputs to said computer module as a function of a modulo difference between said self-identity value and said source identity value.

9. A method as recited in claim 8 wherein said rack includes consecutive positions, said inserting involving inserting plural computer modules into consecutive positions on said rack so that said modules are assigned respectively consecutive self-identity values.

10. A method as recited in claim 9 further comprising connecting M consecutive ones of said modules so that each clock output of said M modules is connected to a clock input of each of said M modules in a round-robin fashion.

11. A method as recited in claim 9 further comprising selecting one of said M modules to serve as a clock source for all M of said modules.

12. A method as recited in claim 11 wherein said connecting involves connecting a first clock input of the module selected as the clock source to its clock output.

13. A method as recited in claim 10 further comprising operating said M modules as a single server driven by a common clock.

14. A method as recited in claim 9 wherein each of said modules has N clock inputs and said modulo is modulo N.

* * * * *